Nov. 22, 1955     M. WAGNER     2,724,600

SPRING SUSPENSION OF STREET VEHICLES

Filed May 5, 1950

INVENTOR
MAX WAGNER
By:
Haseltine, Lake & Co.
AGENTS

United States Patent Office 2,724,600
Patented Nov. 22, 1955

2,724,600

SPRING SUSPENSION OF STREET VEHICLES

Max Wagner, Stuttgart, Germany, assignor to Daimler-Benz Aktiengesellschaft, Stuttgart-Unterturkheim, Germany Application May 5, 1950, Serial No. 160,325

Claims priority, application Germany May 7, 1949

2 Claims. (Cl. 280—106.5)

The invention refers to a spring suspension for road vehicles, in particular of motor vehicles by means of swinging half axles located at the frame. The invention has above all as its subject a purposeful, simple and easily accessible arrangement of the shock absorber, which is preferably shaped as a telescope shock absorber, furthermore such an arrangement, which makes possible a purposeful progressive effect of spring suspension respectively damping. In particular the spring suspension is to be effected by means of helical springs.

For the main part it is therefore a characteristic of the invention that the shock absorber, in particular a telescope shock absorber is arranged outside the axle spring suspension, for example by the side of the helical spring or springs, whereby it is for one part purposefully supported against the swinging half axle by a joint at the side and for the other part against a frame cross member serving for support of the axle springs. The shock absorber is furthermore purposefully arranged in an acute angle to the swinging half axle and approximately parallel to the helical spring which serves as an axle spring suspension.

Such an arrangement results for example in the advantage that the shock absorber is arranged in such a location which is well accessible from the side of the vehicle and easily exchangeable, whereby the sloping position of the shock absorber, which is for example shaped after the telescope way of construction, diminishes the necessary height of construction for its accommodation. Simultaneously the shock absorber can be fastened to the swinging axle and frame cross member without widely throated arms. By an appropriate sloping position of the shock absorber an advantageous progressive damping effect can be achieved. The arrangement of the shock absorber at the side of the helical spring has the further advantage that the space within the helical spring can be utilized for other purposes, for example for accommodation of an additional spring or of elastic stops for the top limit of lift of the swinging half axle or of the spring suspension.

Figure 1:
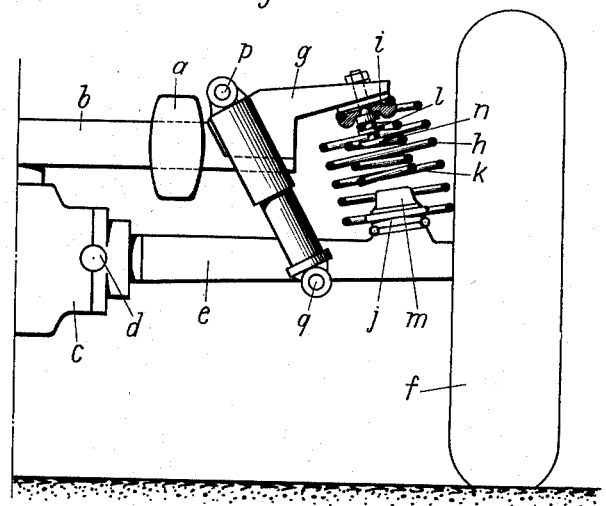
Figure 2:
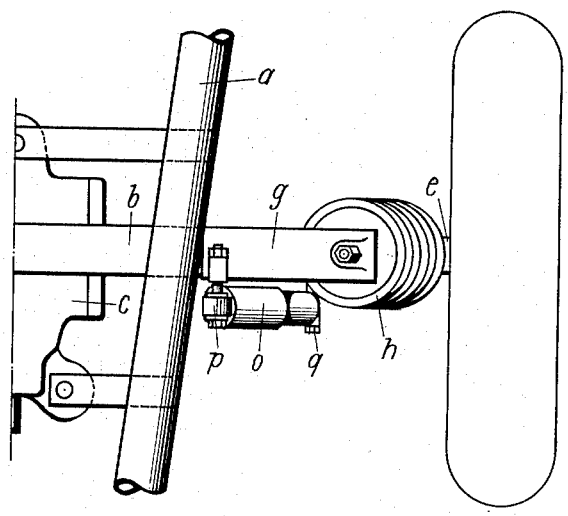

In the drawing an example of construction of the invention is illustrated wherein Figure 1 shows the side view of the swinging half axle of a motor vehicle (partly in a section) and Figure 2 shows a top view on same.

At the vehicle frame with the longitudinal girder or side frame member *a* and the cross member *b* an axle gear *c* is suspended (purposefully elastic), at which the swinging half axle *e* with a rear wheel *f* is linked. On the end of the transverse girder *b* a spring bracket *g* is welded or fastened to the latter in an otherwise appropriate manner, which serves for the support of the unguided helical spring *h*, which serves as a main spring. The upper end of the helical spring, which is wound up on a smaller diameter is attached to the bracket *g* by means of the spring cup *i*. In a similar manner a spring cup *j* serves to fasten the lower end of the helical spring *h*, which is appropriately wound up on smaller diameter, to the swinging half axle *e*. Within the main spring *h* there is furthermore an additional spring *k*, the upper end of which is fastened to the bracket *g* by another spring cup *l*, and the lower end of which is arranged in a freely suspended manner and only laid against the elastic stop *m* at the lower spring cup *j* after a certain upward stroke of the swinging half axle *e*. The entire spring stroke is furthermore limited by an upper stop *n*, which works together for this purpose with the elastic stop *m*.

Outside the helical springs *h* and *k* and at the side of the swinging half axle *e* or aside from the spring bracket *g* of the frame the shock absorber *o* is arranged, which is shaped as a telescope shock absorber and is connected in a flexible manner to the bracket *g* or to the cross member by means of a lateral upper pivot lug *p* and to the swinging half axle by a lower lateral pivot lug *q*. The axis of the shock absorber forms hereby an acute angle with the swinging half axle *e* and is inclined in the same direction as the springs *h* and *k*.

By means of the additional spring *k* a progressive spring suspension at an upward stroke of the half axle is achieved by the fact that the additional spring becomes effective only after a certain spring stroke of the wheels. Furthermore the shock absorber can for example be formed in such a manner that it exercises a relatively small damping effect in or near the normal position of the swinging half axle and results only in an increased damping at a greater upward or downward stroke of the swinging half axle. This progressive effect can be supported by appropriate sloping position of the shock absorber.

Spring suspension and load of the axle can furthermore be adjusted in such a manner that in the normal position of the axle an unloaded or slightly loaded vehicle the swinging half axle is ascended slightly towards the outside.

What I claim is:

1. Spring suspension for road vehicles comprising a frame including side frame and cross members, a swinging half axle pivoted to said frame, a main helical spring directly supported against said half axle and suspending said swinging half axle relatively to said frame, an additional helical spring within said main helical spring, said additional helical spring becoming effective only after a predetermined upward stroke of said swinging half axle from a mean position of rest, a telescopic shock absorber, means for linking said shock absorber to said swinging half axle and to said frame at an inclined position to form an acute angle between the axis of said shock absorber passing through its linking point at the half axle and the axis extending through said linking point and the pivot point of said half axle at said frame, the cross member of said frame extending outwardly beyond said side frame member, said main helical spring and said shock absorber being directly supported against said extended cross member, both said helical springs and said shock absorber being inclined upwardly toward the longitudinal central plane of the vehicle with the inclination of said shock absorber being greater than that of said helical springs, said linking means including a lug arranged laterally of said swinging half axle near the lower support of said main helical spring and a further lug at said extending cross member near said side frame member.

2. Spring suspension of road vehicles comprising a frame having a side frame member extending longitudinally the full length thereof, a cross member connected to said side frame member and having an end portion projecting outwardly beyond said side frame member, a swinging half axle located entirely beneath and pivoted to said frame to swing for the main part in a cross plane passing through said cross member, a helical spring element supported at one end against said swinging half axle and at the other end against said projecting end portion, and a telescopic shock absorber disposed laterally of the projecting end portion of said cross member and offset with respect to said spring element, a lug extending laterally from the projecting end portion located near said side frame member, a further lug extending laterally from said half axle near the lower support of said helical spring element, means for linking the two ends of said telescopic shock absorber at said two lugs whereby the telescopic shock absorber extends upwardly and inwardly toward said longitudinal member, the displacement of said lugs transversely of the vehicle being greater than the transverse displacements of the supporting points of said spring element whereby said telescopic shock absorber has a greater inclination in the direction toward the central longitudinal plane of the vehicle than said spring element.

References Cited in the file of this patent

UNITED STATES PATENTS

| | | |
|---|---|---|
| 1,987,791 | Opolo | Jan. 15, 1935 |
| 2,026,909 | Nallinger | Jan. 7, 1936 |
| 2,159,203 | Chayne | May 23, 1939 |
| 2,204,988 | Haltenberger | June 18, 1940 |
| 2,309,811 | Utz | Feb. 2, 1943 |
| 2,403,145 | Ulrich | July 2, 1946 |
| 2,417,214 | Roos | Mar. 11, 1947 |

FOREIGN PATENTS

| | | |
|---|---|---|
| 434,072 | Great Britain | Aug. 26, 1935 |
| 710,485 | Germany | Sept. 15, 1941 |
| (Corresponding U. S. 2,035,032, March 24, 1936) | | |
| 719,621 | France | Nov. 23, 1931 |